United States Patent [19]

Houshi

[11] 4,131,828
[45] Dec. 26, 1978

[54] APPARATUS FOR ROTATIVELY DRIVING A TURN TABLE

[75] Inventor: Teruo Houshi, Oota, Japan

[73] Assignees: Sanyo Electric Co., Ltd., Moriguchi; Toyko Sanyo Electric Co., Ltd., Oora, Gunma, both of Japan

[21] Appl. No.: 859,264

[22] Filed: Dec. 9, 1977

[30] Foreign Application Priority Data

Dec. 14, 1976 [JP] Japan .................................. 51-153883
Dec. 14, 1976 [JP] Japan .................................. 51-153884
Jan. 31, 1977 [JP] Japan .................................. 52-10420

[51] Int. Cl.$^2$ .......................................... H02K 29/00
[52] U.S. Cl. ............................ 318/138; 274/39 R; 318/41
[58] Field of Search .................. 318/138, 41–44, 318/138, 301; 274/39 R; 310/156

[56] References Cited

U.S. PATENT DOCUMENTS

3,912,283  10/1975  Hammond et al. ................. 318/138
3,922,590  11/1975  Warren et al. ...................... 318/138

*Primary Examiner*—David Smith, Jr.
*Attorney, Agent, or Firm*—Darby & Darby

[57] ABSTRACT

An apparatus for rotatively driving a turn table comprising a motor including a rotor having an arrangement of a plurality of permanent magnet poles such that north and the south poles are alternately disposed in a circle on the turn table and a stator provided to be opposed to the arrangement of the permanent magnet poles and including three stator pole means for electromagnetically driving the rotor, three saturable core coils provided to be opposed to the rotor and disposed to bring about a phase difference of 120° from each other with respect to the arrangement of the rotor magnet poles, an oscillator for providing a predetermined frequency signal, three amplitude modulators for amplitude modulating the oscillator signal as a function of the inductance value of the corresponding saturable core coils which varies in association with the revolution of the turn table, a diode for demodulating the amplitude modulated outputs of each of the modulators, an amplifier for amplifying each of the corresponding amplitude demodulated signals and supplying the same to one end of the corresponding drive coils of the stator pole means, and a feedback resistor coupled to the other end of each of the drive coils of the stator pole means, the other end of each of the feedback resistors being commonly connected.

10 Claims, 16 Drawing Figures

(A) |—STARTING STATE—|—STEADY STATE—|

(B)

(C)

(A)

(B)

322

(C)

323

APPARATUS FOR ROTATIVELY DRIVING A TURN TABLE

BACKGROUND OF THE INVENTION

1. Field of the Invention

The present invention relates to an apparatus for rotatively driving a turn table. More specifically, the present invention relates to an apparatus for rotatively driving a turn table, such as a turn table of a record player, and the like.

2. Description of the Prior Art

Various types of appratuses for rotatively driving a turn table, typically a turn table of a record player, have been already proposed and put into practical use. In particular, apparatuses of an idler type, a belt drive type, a direct drive type and the like have been proposed, in order to drive a turn table of a record player. Among other things, it has been observed that an apparatus of a direct drive type for directly driving a turn table by means of a motor shaft without recourse to an idler nor belt is advantageous. A direct current brushless motor has been commonly utilized as a driving motor for an apparatus of a direct drive type. Nevertheless, a conventional direct current brushless motor is expensive and in addition requires a complicated control circuit including a speed detecting scheme for a stabilized revolution. For this reason, a direct current brushless motor has been employed only in high quality record players.

A direct drive type motor which is relatively inexpensive has also been developed, which comprises a rotor including an arrangement of a plurality of permanent magnet pieces of north and south poles disposed alternately and equally spaced along the periphery of a turn table and a stator provided to be opposed only to a portion of the arrangement of these permanent magnet pieces. Because of an arrangement of a stator opposing only to a portion of the permanent magnet arrangement along the periphery of a turn table, such a motor may be referred to as a partial drive type motor. The principle and the structure of such a so called partial drive type motor is disclosed in U.S. Pat. No. 3,922,590 issued Nov. 25, 1972 to Anthony Charles Warren et al. A so called partial drive type motor employing the principle disclosed in the above referenced United States patent may be used in an apparatus of a direct drive type. However, relative movement of the magnetic poles of the rotor and the magnetic poles of the stator alternately gives rise to the maximum attracting force and minimum attracting force depending on the relative displaced amount between these rotor magnetic poles and stator magnetic poles, resulting in uneven revolution of the rotor. For this reason, a conventional partial drive type motor is not preferred for driving a high quality record player. Thus, it is preferred that a so called partial drive type motor of an inexpensive cost be provided wherein the above described problem of uneven revolution is eliminated.

SUMMARY OF THE INVENTION

The present invention comprises an apparatus for rotatively driving a turn table comprising a motor including a rotor including an arrangement of a plurality of permanent magnet pieces such that the north and south poles are alternately disposed in a circle on said turn table and a stator provided opposite to said arrangement of the permanent magnet pieces and including first, second and third stator pole means for electromagnetically driving said rotor, means for generating a three-phase alternate current drive signal of three component alternate current drive signals having a phase difference of 120° from each other, and means responsive to said drive signal generating means for amplifying said three alternate current drive signals for supplying the three amplified alternate current drive signals to said three stator pole means of said stator of said motor. Said amplifying means comprises first, second and third amplifiers for amplifying said three component alternate current drive signals, respectively, the output terminals of said first, second and third amplifiers being coupled to one end of each of said first, second and third pole means of said stator, respectively, the other end of each of which is coupled to one end of each of first, second and third feedback resistors, respectively. Said first, second and third feedback resistors are commonly connected at the other end, whereby at least the component of the same level and the same phase included in said alternate current drive signals is removed.

In a preferred embodiment, said drive signal generating means comprises three sensors provided opposite to said rotor and disposed to bring about a phase difference of 120° from each other with respect to said arrangement of permanent magnet pieces, said sensor each giving rise to a variation of the inductance thereof as a function of the rotation of said rotor, an oscillator for generating a signal of a predetermined frequency, means responsive to said variation of the inductance of said sensors as a function of the rotation of said rotor for amplitude modulating the output signal from said oscillator, and amplitude demodulators for amplitude demodulating the output signals from said amplitude modulators.

In a further preferred embodiment, said pole means of said stator of said motor comprise three stator drive coils each adapted to be supplied with the corresponding one of said three drive signals having a phase difference of 120° from each other, and three pairs of stator yokes to be magnetized in a north pole or a south pole by means of said stator drive coils, wherein said each pair of stator yoke comprises a plurality (n) of teeth spaced apart from each other by a predetermined electrical angle in terms of the arrangement of magnetic poles of said rotor. Preferably, such electrical angle is selected to be $$180 \text{ degree} + \frac{360}{6n} \text{ degree}.$$

Accordingly, a principal object of the present invention is to provide an apparatus for rotatively driving a turn table employing an inexpensive partial drive type motor, wherein a problem of uneven revolution of the turn table has been eliminated.

Another object of the present invention is to provide an apparatus for rotatively driving a turn table employing a partial drive type motor, wherein the motor is driven with three sine wave signals having a phase difference of 120° from each other.

A further object of the present invention is to provide a drive signal generator for generating drive signals most suited for driving a partial drive type motor upon direct detection of the revolution of a turn table.

Still a further object of the present invention is to provide an amplifier for removing effectively the same phase component such as a direct current component, a third harmonic and the like included in three sine wave signals having a phase difference of 120° from each other to be used for driving a partial drive type motor.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
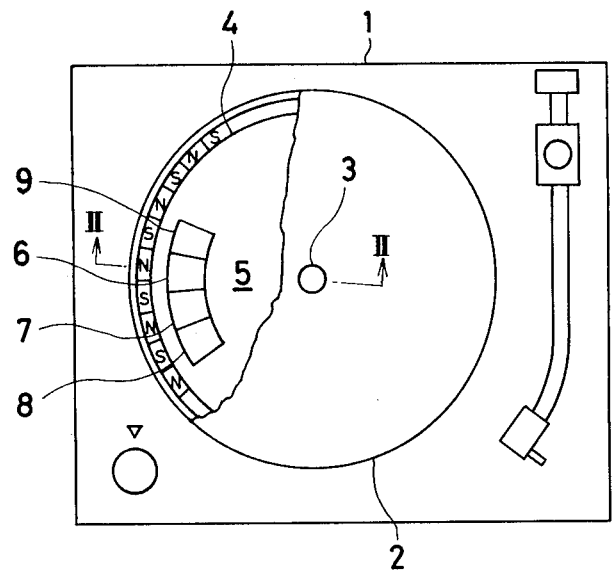
FIG. 1 shows a plan view of a record player employing a partial drive type motor in accordance with the inventive apparatus for rotatively driving a turn table, wherein a portion of the turn table has been removed to show the partial drive type motor.
Figure 2:
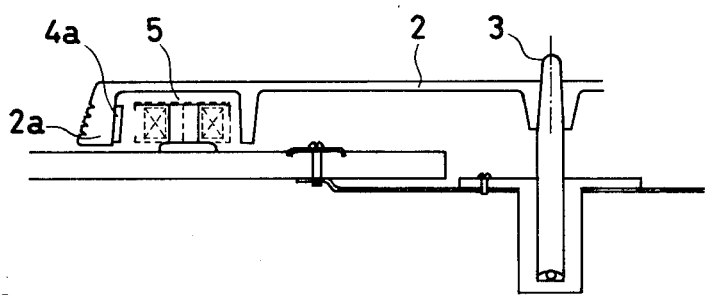
FIG. 2 is a sectional view of the turn table taken along the lines 2—2 in FIG. 1.

FIG. 1 shows a plan view of a record player employing a partial drive type motor of the inventive apparatus, wherein a portion of a turn table has been removed to show the internal structure of the partial drive type motor. The record player comprises a turn table board 1 of the record player, a turn table 2 rotatably mounted at the center thereof on a shaft 3, a rotor 4 comprising an arrangement of multi-pole permanent magnet pieces disposed such that the north and south poles are alternately disposed and equally spaced in a circle along the periphery of the turn table 2, a stator 5 comprising first, second and third electro-magnets 6, 7 and 8 for electromagnetically driving the rotor 4, and a sensor 9 for generating a signal representative of the positional relation of the magnet piece arrangement of the rotor 4 with respect to the stator 5. The relation of the rotor 4 and the stator 5 has been shown in a simplified manner in FIG. 1. However, as seen in the sectional view of the turn table 2 in FIG. 2, the turn table 2 is typically implemented by diecast aluminum and comprises a circular rib 2a on the lower surface thereof, to which a magnet 4a is fixed to form the rotor 4. The magnet arrangement of the rotor 4 comprises 120 poles provided with 5.5mm pitch, for example. A typical conventional direct drive type motor uses for the rotor magnet poles only as many as four to twenty at the most. By contrast, the embodiment shown comprises a considerably increased number of magnetic poles, which provides the basis for affording the features of a linear motor. One of the features resides in that a frequency control servo mechanism of less drift can be achieved without need for a sophisticated speed detection scheme. This is because the rotor magnet poles are as many as 120, which increases the frequency of a counter electromotive force induced in a drive coil to be described subsequently for the stator, the frequency being 33⅓ Hz in case of an 33⅓ rpm record and 45 Hz in case of 45 rpm record.

Figure 3:
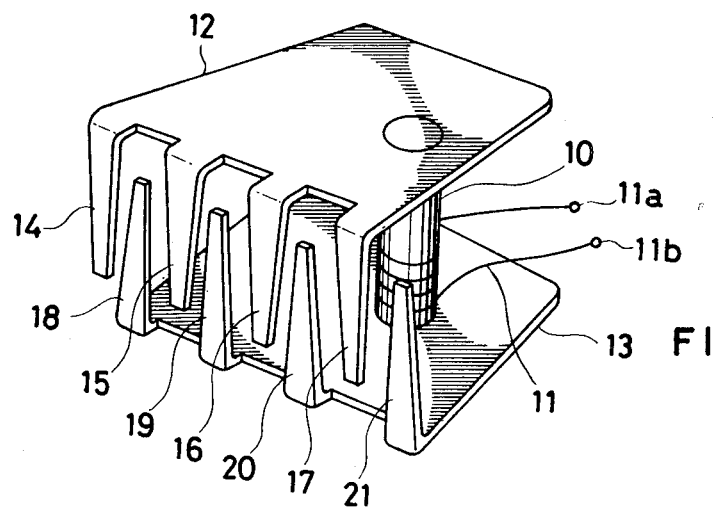
FIG. 3 shows a perspective view of a stator of the inventive partial drive type motor.

FIG. 3 shows a perspective view of the structure of one electro-magnet of the stator 5. The electro-magnet comprises a core 10 on which a drive coil 11 is wound, a first yoke 12 magnetically coupled to one end of the core 10 and a second yoke 13 magnetically coupled to the other end of the core 10. As shown, one end of each of the first and second yokes 12 and 13 is toothed and is bent at an approximate right angle such that the toothed portions of the yokes 12 and 13 are interdigitated. In the embodiment shown, the first yoke 12 has four teeth, 14, 15, 16 and 17 and the second yoke 13 has four teeth 18, 19, 20 and 21. Referring to FIG. 3, if and when a drive current is applied in the polarity that one terminal 11a of the drive coil 11 is positive and the other terminal 11b of the drive coil 11 is negative, the first yoke 12 is magnetized to the north pole and the second yoke 13 is magnetized to the south pole. On the contrary, if and when a drive current is applied in the polarity that one terminal 11a of the drive coil 11 is negative and the other terminal 11b of the drive coil 11 is positive, the first yoke 12 is magnetized to the south pole and the second yoke 13 is magnetized to the north pole. The current applied to the drive coil 11 is obtained based on the signal obtainable upon detection by the sensor 9 of the positional relation of the rotor 4, as to be more fully described subsequently.

One drive coil of one electro-magnet included in the stator 5 can drive approximately eight poles, for example, out of 120 poles of the rotor magnet. The embodiment is shown comprising three drive coils, i.e. three electro-magnets 6, 7 and 8. This means that these three drive coils and thus these three electro-magnets serve to drive approximately 24 poles out of 120 poles of the rotor magnet. This can be better understood with reference to FIGS. 4 and 5.

Figure 4:
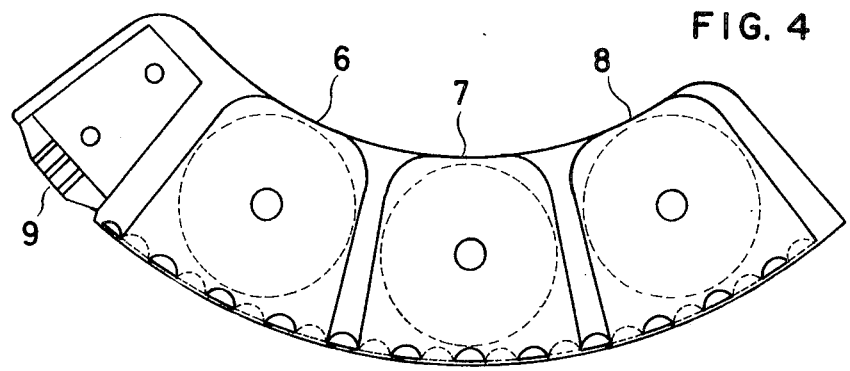
FIG. 4 shows a plan view of one embodiment of the stator of the inventive partial drive type motor.
Figure 5:
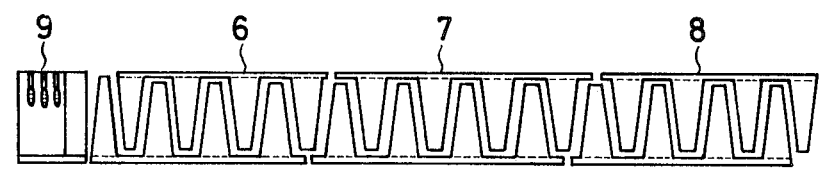
FIG. 5 shows a front view of the FIG. 4 embodiment.
Figure 6:
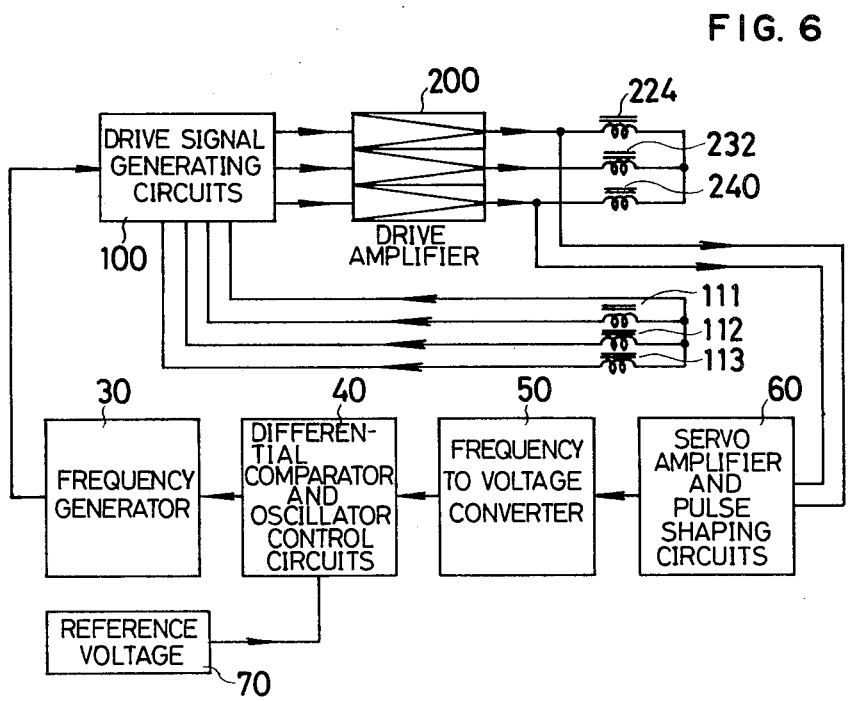
FIG. 6 shows a block diagram of the inventive apparaus.

More specifically, FIG. 4 shows a plan view of the first, second and third electro-magnets 6, 7 and 8 and the sensor 9 positioned in site in the operating state, and FIG. 5 shows an elevational view of the FIG. 4 embodiment. Since each of the first, second and third electro-magnets 6, 7 and 8 has four teeth of the first yoke and four teeth of the second yoke, the drive coil assembly comprises twenty four teeth in total. It would be appreciated that these twenty four teeth are magnetized alternately to be north and south poles. It would be further appreciated that by virtue of attracting and repulsive force exerted between the stator 5 thus magnetized and the rotor 4 the rotor 4 and thus the turn table 2 is rotatively driven by the stator 5. FIG. 6 shows a block diagram of the inventive apparatus for rotatively driving a turn table described with reference to FIGS. 1 through 5. The rotative drive apparatus comprises a servo amplifier and pulse shaping circuit 60 for servo amplifying and pulse shaping the counter electromotive force induced in the three drive coils in the stator 5, a frequency-voltage converter 50 for converting the frequency of the pulses thus shaped into a voltage, a reference voltage generator 70 for generating a reference voltage associated with a preset speed of the turn table, a differential comparator and oscillator control circuit 40 for comparing the voltage from the frequency-voltage converter 50 and the reference voltage from the reference voltage generator 70 for determining whether the motor speed is fast or slow for controlling a direct current voltage corresponding to the preset rotation speed of the turn table, a frequency generator 30 responsive to the direct current voltage level from the control circuit 40 for varying the oscillation output level, a drive signal generator 100 for generating sine waves of three phases having a phase difference of 120° from each other through amplitude modulation by three saturable coils 111, 112 and 113 in the sensor 9 and through amplitude demodulation of the amplitude modulated signals, and a drive amplifier 200 for amplifying the three phase signals thus obtained. As described previously, the drive signal of the serve control circuit comprising the blocks 30, 40, 50, 60 and 70 is obtained directly from the drive coils of the stator 5. Therefore, no speed detecting apparatuses such as a tachometer coil, a Hall device, or the like are used and thus no problems of such as a temperature drift, or the like in a speed detecting apparatus are involved.

Figure 7:
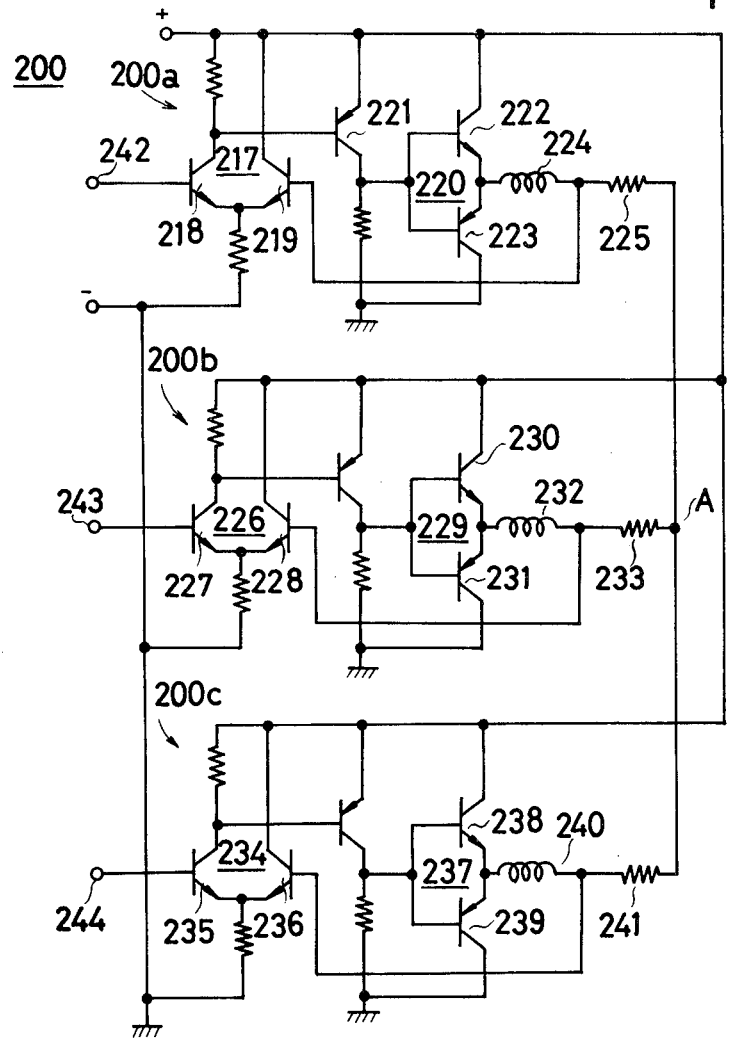
FIG. 7 shows a schematic diagram of a preferred embodiment of a driver in FIG. 6.
Figure 8:
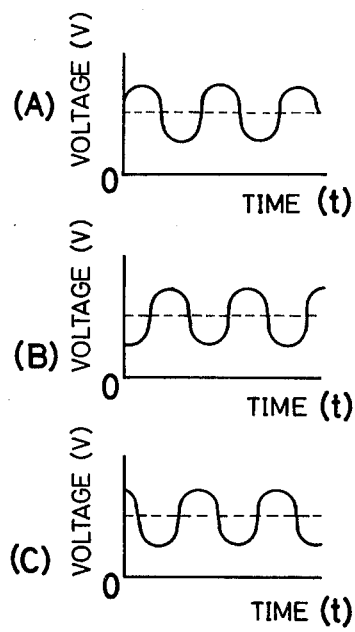
FIG. 8 shows wave forms of the electrical signals to be applied to the three input terminals in the FIG. 7 diagram.

FIG. 7 shows a schematic diagram of the FIG. 6 drive amplifier 200. As described previously, the drive amplifier 200 is aimed to amplify three signals having a phase difference of 120° from each other. As to be described subsequently, these three signals include a direct current component, which causes vibration of a turn table if and when the same flows through the drive coil of the stator 5. Accordingly, it is required to remove a direct current component from these three signals. However, it is possible to block a direct current simply by means of a capacitor. Rather, it is required to cause a direct current to flow as a drive current at the time of starting of the motor or in case where the turn table is locked. To that end, the drive amplifier is implemented in a combination of three amplifiers, as shown in FIG. 6, wherein three differential amplifiers are implemented as a whole, such that a null direct current is cancelled out by balancing them. Referring to FIG. 7, the drive amplifier 200 comprises a first amplifier 200a, a second amplifier 200b, and a third amplifier 200c. These three amplifiers 200a, 200b, and 200c are adapted to have the same circuit configuration. Therefore, only the first amplifier 200a is described in more detail in the following. The first amplifier 200a comprises a first differential amplifier 217 comprising a pair of transistors 218 and 219 of the same polarity type, a first pushpull amplifier 220 comprising a pair of transistors 220 and 223 of the opposite polarity type, and an interstage transistor 221 for coupling the first differential amplifier 217 and the first pushpull amplifier 220. The base electrode of one transistor 218 of the first differential amplifier 217 is connected to the input terminal 242 receiving the first phase signal from the drive signal generator 100 (FIG. 6). The collector electrode of the transistor 218 is connected through a resistor to the positive terminal of the power supply. The emitter electrodes of the transistors 218 and 219 are commonly connected and are further connected through a resistor to the negative terminal of the power supply. The base electrode of the transistor 219 is connected through the first drive coil 224 of the stator 5 to the output of the first pushpull amplifier 220. The output of the first differential amplifier 217 is withdrawn from the collector electrode of the transistor 218 and is applied to the base electrode of the interstage transistor 221. The emitter electrode of the interstage transistor 221 is connected to the positive terminal of the power supply and the collector electrode of the interstage transistor 221 is grounded through a resistor and is also connected to the base electrodes of the transistors 222 and 223 constituting the first pushpull amplifier 220. The emitter electrode of the transistor 222 and the emitter electrode of the transistor 223 are commonly connected, thereby to form the output stage of the first amplifier 200a. One end of the first drive coil 224 of the stator 5 is connected to the output point of the first pushpull amplifier 220. The other end of the first drive coil 224 is connected to the base electrode of the transistor 219 of the first differential amplifier 217, as described previously, and is also connected in series with the first feedback resistor 225. The other end of the first feedback resistor 225 is commonly connected to the second feedback resistor 233 of the second amplifier 220b and the third feedback resistor 241 of the third amplifier 200c. Although the second amplifier 200b and the third amplifier 200c are also structured in the same circuit configuration as that of the first amplifier 200a, the input terminal 243 of the second amplifier 200b is connected to receive the second phase signal and the input terminal 244 of the third amplifier 200c is connected to receive the third phase signal. The first, second and third signals are of a phase difference of 120° from each other, as described previously. One example of such three different signals is shown in FIG. 8.

With reference to the wave forms shown in FIG. 8, the operation of the drive amplifiers shown in FIG. 7 will be described in the following. At the outset, consider a case where three signals as shown as (A), (B), and (C) in FIG. 8, including the equal level direct current component and shifted by 120° in terms of phase, are applied to the first, second and third signal input terminals 242, 243 and 244. The signal as shown as (A) in FIG. 8 is first amplified by the first differential amplifier 217 and is applied through the interstage transistor 221 to the first pushpull amplifier 220 and is further amplified thereby to be applied to the first drive coil 229. Similarly, the signal as shown as (B) in FIG. 8 is amplified by the second differential amplifier 226 and the second pushpull amplifier 229 and is applied to the second drive coil 232. Likewise, the signal as shown as (C) in FIG. 8 is amplified by the third differential amplifier 234 and the third pushpull amplifier 237 and is applied to the third drive coil 240. Now assuming the voltage of the signal applied to the first signal input terminal 242 to be E1, the voltage of the signal applied to the second input signal terminal 243 to be E2 and the voltage of the signal applied to the third signal input terminal 244 to be E3, the voltage Ea at the common junction A of the first, second and third feedback resistors 225, 233 and 241 each having the equal resistance value R may be expressed by the following equation.

$$EA = \frac{E1 + E2 + E3}{3} \tag{1}$$

Accordingly, the current I1 flowing through the first drive coil 224 may be expressed by the following equation.

$$I1 = \frac{E1 - EA}{R} = \frac{2}{3} \frac{E1 - \frac{E2 + E3}{2}}{R} \tag{2}$$

Similarly, the current I2 flowing the second drive coil 232 may be expressed by the following equation.

$$I2 = \frac{E2 - EA}{R} = \frac{2}{3} \frac{E2 - \frac{E1 + E3}{2}}{R} \tag{3}$$

The current I3 flowing through the third drive coil 240 may be expressed by the following equation.

$$I3 = \frac{E3 - EA}{R} = \frac{2}{3} \frac{E3 - \frac{E1 + E2}{2}}{R} \tag{4}$$

As seen from the above described equations (2), (3) and (4), a same phase component such as a direct current component, and third harmonics and the like in the voltages E1, E2 and E3 have been fully removed. Thus, it would be appreciated that a drive current of little distortion can be obtained according to the present invention. This is achieved, because a connection of the first, second and third drive coils and the feedback resistors is implemented as shown in FIG. 7. As a result, a direct current amplifier can be used as an amplifier, which is operable even with respect to a very low frequency signal.

Another feature of the FIG. 7 drive amplifier is that the amplifier can supply a positive or negative direct current to the stator coils, i.e. the drive coil, by the use of a single power supply, resulting in simplified circuit configuration.

Although in FIG. 7, a preferred embodiment of the drive amplifier in FIG. 6 was shown wherein the differential amplifier is directly coupled to the pushpull amplifier, the present invention is not limited to such a circuit configuration but can be implemented in various modified forms.

Figure 9:
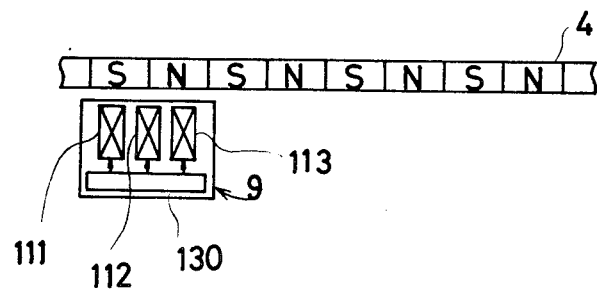
FIG. 9 shows a positional relation between the rotor and the sensor.
Figure 11:
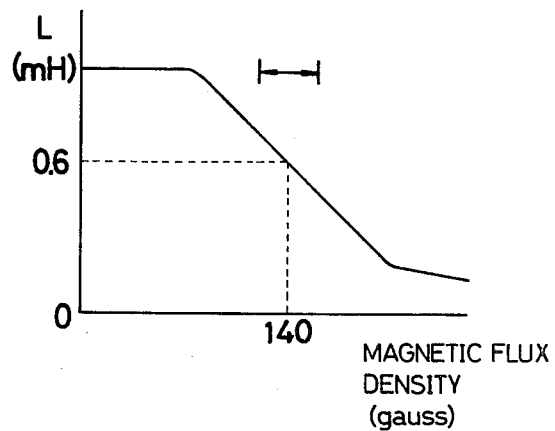
FIG. 11 shows an inductance-magnet flux density characteristic of a saturable core coil included in the FIG. 9 sensor.

Now description will be made how the sensing coils 111, 112 and 113 and the drive signal generator 100 shown in FIG. 6 cooperate with each other to generate three drive signals having a phase difference of 120 degreeds from each other. The sensing coils 111, 112, and 113 comprise three saturable core coils provided in the sensor 9 fixed to the stator 5. The positional relation of the sensor 9 and the rotor 4 is shown in FIG. 9. The sensor 9 comprises the first, second and third saturable core coils 111, 112 and 113, and a biasing magnet 130 for magnetically biasing these saturable core coils 111, 112 and 113. These saturable core coils 111, 112 and 113 are provided to be opposed to the magnet poles of the rotor 4. These saturable core coils 111, 112 and 113 may each comprise a coil of a copper winding wound on a drum type ferrite core. FIG. 11 shows a characteristic curve of the inductance versus magnetic flux density of such a coil, wherein the inductance value varies as the magnetic flux density occuring through the coil varies. The biasing magnet 130 provides a constant magnetic bias to the saturable core coils 111, 112 and 113 in the arrow direction. When the rotor 4 is rotated, the variation of the magnetic flux density in the saturable core coil is converted into a variation of the inductance value. As a result, the saturable core coils 111, 112 and 113 serves to detect which polarity pole, the north pole or the south pole, the magnetic pole of the rotor 4 opposing thereto is. The oscillation output of the oscillator 30 is amplitude modulated in accordance with the detected output.

The sensor 9 is aimed to detect the phase of the current to be applied to the respective drive coils of the oscillator 5. Hence, it can be said that the sensor 9 corresponds to a commutator of a commutator motor. Although the sensor may be implemented with a Hall effect device, in the embodiment shown a saturable core coil was employed taking into consideration the fact that three phase signals can be obtained with ease, as to be described subsequently.

Figure 10:
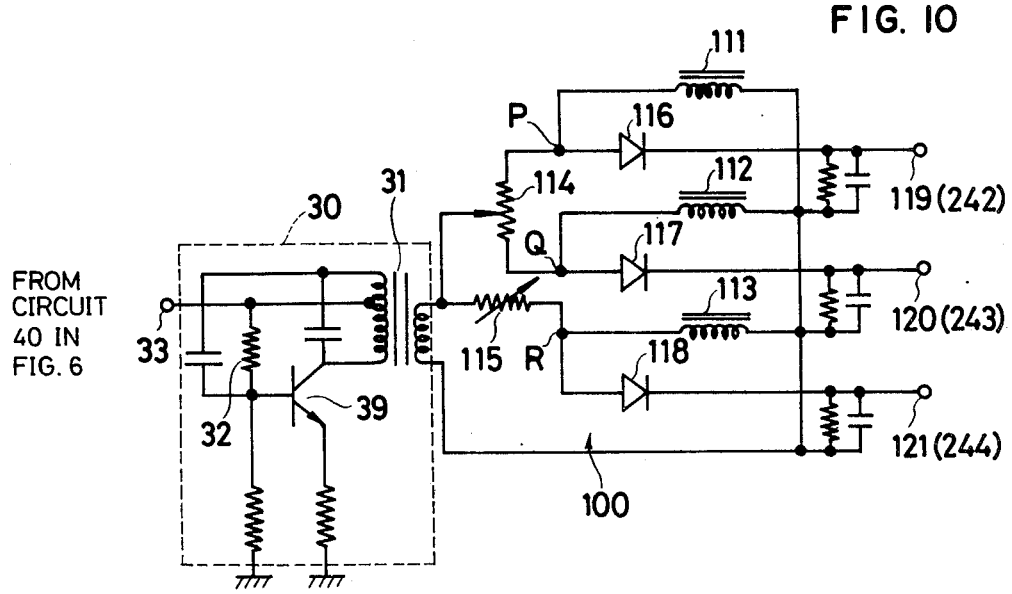
FIG. 10 shows a schematic diagram of a drive signal generator in accordance with the present invention.

FIG. 10 shows a schematic diagram of the drive signal generator, which comprises an oscillator 30, the drive signal generator 100 and three saturable core coils 111, 112 and 113 of the sensor 9. The oscillator 30 comprises an oscillation transistor 39 and an oscillation transformer 31. The base electrode of the oscillation transistor 39 is connected through a resistor 32 to the output of the differential comparator and oscillation control circuit 40 (FIG. 6). The emitter electrode of the transistor 39 is connected through a resistor to the ground, while the collector electrode of the transistor 39 is connected to one end of the primary winding of the oscillation transformer 31. The oscillation output of the oscillator 30 is withdrawn from the secondary winding of the oscillation transformer 31. One end of the secondary winding of the oscillation transformer 31 is connected to the slider terminal of a variable resistor 114 and also to one end of a variable resistor 115. One end of the variable resistor 114 is connected through the junction P to one end of the first saturable core coil 111 and also to the anode of a first detecting diode 116. The other end of the variable resistor 114 is connected through the junction Q to one end of the second saturable core coil 112 and also to the anode of the second detecting diode 117. The other end of the variable resistor 115 is connected through the junction R to one end of the third saturable core coil 113 and also to the anode of a third detecting diode 118. The other ends of the first, second and third saturable core coils 111, 112, and 113 are commonly connected and coupled to the lower end of the secondary winding of the oscillation transformer 31 of the oscillator 30. The cathodes of the first, second and third detecting diodes 16, 17 and 18 are connected to the output terminals 119, 120 and 121 of the drive signal generator 100, respectively. These output terminals 119, 120 and 121 are connected to the input terminals 242, 243 and 244 of the drive amplifier 200 in FIG. 7.

The variable resistor 114 is provided for balance adjustment of a high frequency voltage of the first and second saturable core coils 111 and 112. The variable resistor 115 is adjusted such that the high frequency voltage of the third saturable core coil 113 becomes commensurate with those of the first and second saturable core coils 111 and 112. In addition, the first, second and third saturable core coils 111, 112 and 113 are disposed as shown in FIG. 9, such that these are of a phase difference of 120° from each other. As a result, the output signals for driving the rotor having a phase difference of 120° from each other are obtained from these three output terminals 119, 120 and 121 in FIG. 10.

Figure 12:
FIG. 12 shows wave forms of the electrical signals for explanation of the operation of the generator of FIG. 10.
Figure 12:
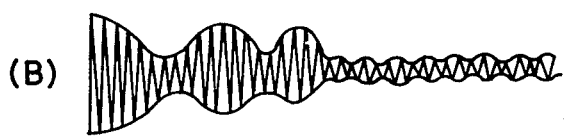
Figure 12:

Now referring to FIGS. 9 and 11, the operation of the circuit of FIG. 10 will be described. As described in conjunction with FIG. 6, the control input terminal 33 of the oscillator 30 is supplied with a direct current voltage associated with the revolution speed of the turn table. As a result, the output level of the oscillator 30 varies as a function of the magnitude of the direct current voltage. The oscillator is structured such that when the revolution speed of the turn table becomes slow with respect to the preset speed the direct current voltage becomes larger and accordingly the output level of the oscillator 30 becomes larger, for example. Therefore, the output signal of the oscillator 30 is larger at the time of starting and becomes smaller in the steady state, as shown as (A) in FIG. 12. The output signal of the oscillator 30 withdrawn from the secondary winding of the oscillator transformer 31 undergoes amplitude modulation by means of the first, second and third saturable core coils 111, 112 and 113. More specifically, the inductance of these coils increases in such a positional relation where the magnet of the rotor 4 fixed to the turn table and the bias magnet 130 of the sensor 9 comes to offset the magnetic flux of each other, whereby the terminal voltage of the saturable core coils increases. This means that the saturable core coil comes to be opposed to the south pole, since the magnetic flux of the bias magnet 130 is applied in an additive direction when the saturable core coil comes to be opposed to the north pole of the rotor magnet. On the contrary, if the north pole is opposed, the magnetic flux acts to decrease the inductance, thereby to decrease the terminal voltage of the saturable core coil. Thus, the modulated signal (FIG. 12 (B)) as amplitude modulated by a sine wave of the oscillation frequency carrier from the oscillator 30 is obtained at each of the points P, Q and R in FIG. 10. The signal obtained at the point P is amplitude demodulated by the first detecting diode 116, the signal obtained at the point Q is amplitude demodulated by the second detecting diode 117 and the signal obtained at the point R is amplitude demodulated by the third detecting diode 118, whereby the output signal as shown as (C) in FIG. 12 is obtained at each of the first, second and third output terminals 119, 120 and 121. The output signal is of a sine wave form, the amplitude of which is varied continuously in accordance with the rotation of the rotor. The output signal is applied to each of the input terminals 242, 243 and 244 of the drive circuit (FIG. 7) of the stator, whereby the partial drive type motor is rotatively driven.

As described with reference to FIG. 10, the drive signal generator can readily provides a sine wave signal the amplitude of which is continuously variable. In particular, three sine wave signals having a phase difference of 120° from each other are generated by the use of three saturable core coils and the levels of these signals are controlled in parallel simultaneously as a function of variation of a power supply voltage of a single oscillator.

Figure 13:
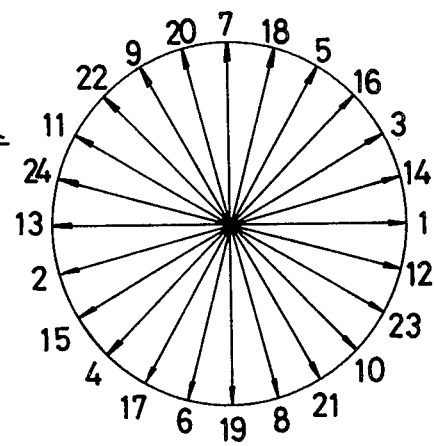
FIG. 13 shows a vector diagram showing an arrangement of the teeth of the magnet of the FIGS. 4 and 5 stator.

The structure of the stator 5 was previously described in detail with reference to FIGS. 3 through 5. Referring again to FIGS. 4 and 5, how twenty four teeth are disposed will be discussed in more detail. According to the present invention, the above described twenty four teeth are disposed with the spacing as shown in the vector diagram in FIG. 13. Assuming that the spacing between two adjacent teeth be 180° + 15°, it does not occur that the phases of all teeth coincide with each other. The spacing of these teeth may be obtained by the following equation. More specifically, assuming that the spacing between the two adjacent teeth (in terms of the electrical angle) be X and the number of teeth of a single electric magnet be 2n, then the following equation is obtained.

$$X \text{ (degree)} = 180 \text{ (degree)} + \frac{360}{3 \times 2n} \text{ (degree)} \qquad (5)$$

where n is an integer. For example, assuming that n is unity, then X is 240 (degree) and, in case of n being 2, X is 210 (degree). The embodiment shown in FIGS. 4 and 5 is of a case where n is 4 and the spacing between two adjacent teeth is 195°.

Figure 14:
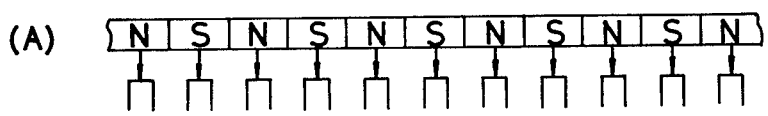
FIG. 14 shows a diagram for explaining the operating principle of the partial drive type motor.
Figure 14:
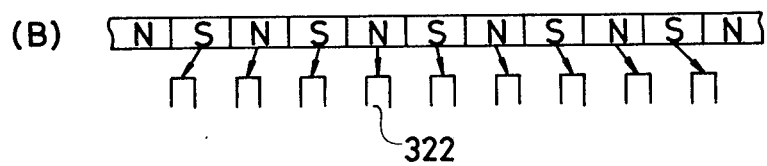
Figure 14:
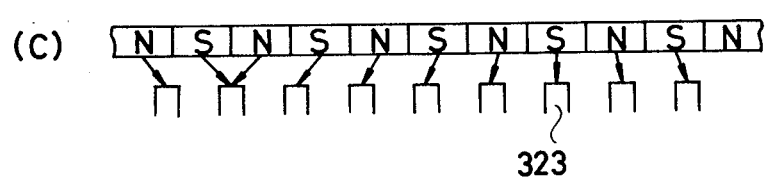

Generally speaking, since the first and second yokes 12 and 13 are magnetized in opposite polarity, the spacing between two of their adjacent teeth must be 180°. However, if the spacing of 180° is assumed, the pitches of the rotor and stator coincide with each other, with the result that as shown in FIG. 14 (A) all the teeth become simultaneously of the maximum attracting force or of the minimum attracting force, thereby to cause uneven rotation. By contrast, if the spacing between the two adjacent teeth is shifted by a predetermined angle from 180°, in accordance with the present invention, then a situation is eliminated where all the teeth become of the same attracting force simultaneously. More specifically, in a positional relation of the rotor and the stator as shown as (B) in FIG. 14, the tooth 322 becomes of the maximum attracting force while the remaining teeth become of less attracting force which is less as the angle is shifted. In the positional relation as shown as (C) in FIG. 14, the tooth 323 becomes of the maximum attracting force while the remaining teeth become of less attracting force. Accordingly, the average attracting force remains the same at any time, with the result that uneven rotation is drastically reduced.

Figure 15:
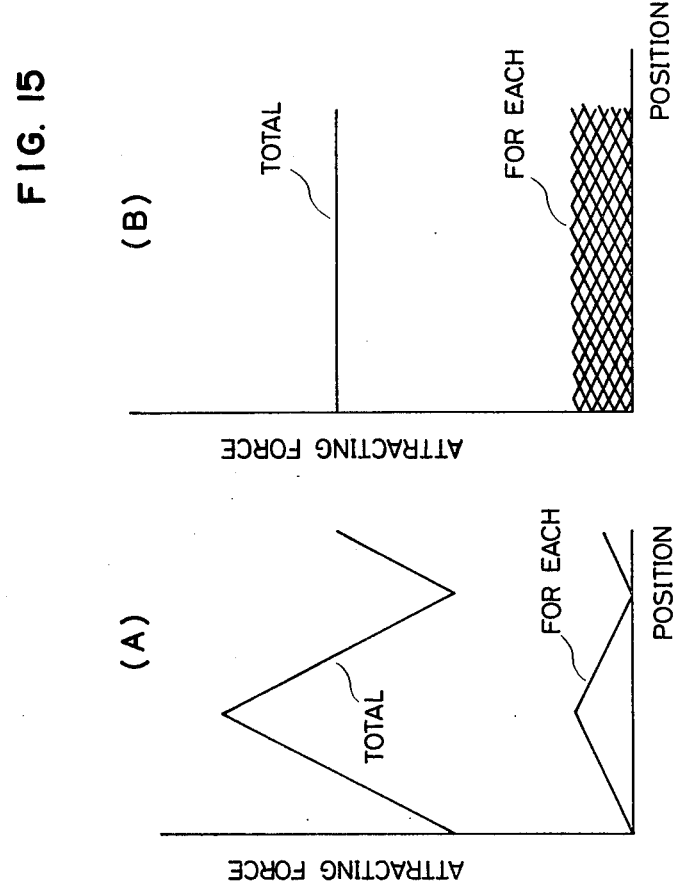
FIG. 15 shows a characteristic curve for explaining the advantages of the present invention.

FIG. 15 shows characteristic curves of the rotor position versus attracting force, wherein (A) shows a characteristic in the case where the spacing between two adjacent teeth is selected to be 180° and (B) shows a characteristic in the case where the spacing between two adjacent teeth is selected to be 195°. Referring to FIG. 15 (A), the attracting characteristic of each tooth is overlapped throughout all the teeth, whereby uneveness of the attracting force is caused. Now referring to FIG. 15 (B), since the maximum attracting force of each tooth has been shifted from each other throughout all the teeth, the average attracting force becomes fairly constant.

The number of poles of the rotor and the number of teeth of the stator in the example of twenty four teeth in all as shown in FIGS. 4 and 5 are shown in the following.

| | |
|---|---|
| ° Number of poles of rotor | 120 poles (pitch of poles 3.0 degree) |
| ° Number of teeth of stator | 24 teeth (pitch of teeth 3.25 degree) |

According to the present invention, since the spacing between two adjacent teeth is selected as shown in the equation (5), uneven rotation of the motor is drastically reduced. In addition, in the embodiment shown in FIGS. 3 and 5, the shape of each tooth has been selected in a preferred form. More specifically, the shape of each tooth has been selected as a trapezoidal or triangular shape. Therefore, variation of polarity as the rotor is rotated becomes smooth, with the result that vibratory movement of the teeth is further alleviated as compared with a case of rectangular teeth.

Figure 16:
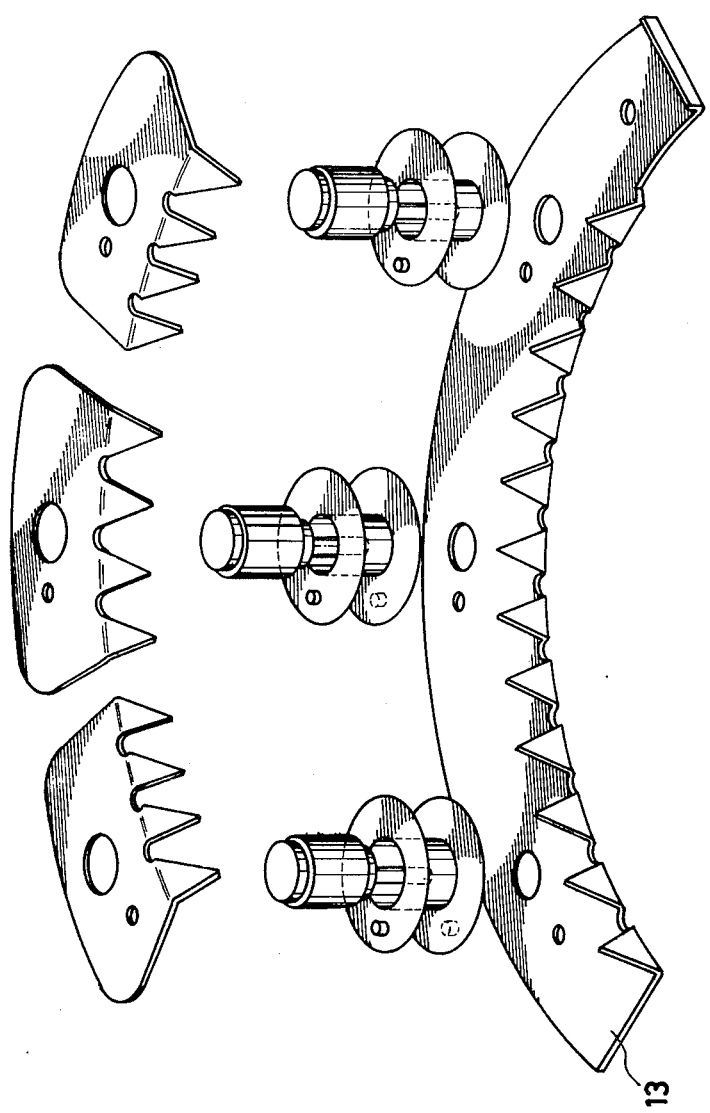
FIG. 16 shows a disassembled perspective view of an alternative embodiment of the stator structure.

FIG. 16 shows a disassembled perspective view of an alternative embodiment of the stator. In the embodiment shown, three second yokes 13 in the FIGS. 3 through 5 embodiment have been integrally formed to constitute a single yoke. Such configuration enables formation of three coil fixing apertures by a single pressing process and also enables simple and accurate mutual positioning of the first, second and third upper yokes, with the result that accurate electrical angle of 120° can be maintained.

Although the preferred embodiment of the present invention has been described and illustrated in detail, it is to be clearly understood that the same is by way of illustration and example only and is not to be taken by way of limitation, the spirit and scope of the present invention being limited only by the terms appended claims.

What is claimed is:

1. An apparatus for rotatively driving a turn table, comprising:
   a motor having a rotor including an arrangement of a plurality of magnetic poles such that the north and south poles are alternately disposed in a circle on said turn table and a stator provided opposite to said arrangement of the magnetic poles and including first, second and third stator pole means for electromagnetically driving said motor,
   means for generating three alternating current drive signals having a phase difference of substantially 120° from each other,
   means responsive to said drive signal generating means for amplifying said three alternating current drive signals for supplying the three amplified alternating current drive signals to said three stator pole means of said stator of said motor,
   said amplifying means comprising first, second and third amplifiers for amplifying said three alternating current drive signals, respectively, for supplying the amplified three alternating current drive signals to one end of the corresponding one of said first, second and third pole means of said stator, respectively, and
   first, second and third feedback resistors, one end of each of said first, second and third feedback resistors being coupled to the other end of each of said first, second and third pole means of said stator, respectively,
   said first, second and third feedback resistors being commonly connected at the other end, whereby at least the component of the same level and the same phase included in said alternating current drive signals is removed.

2. An apparatus for rotatively driving a turn table in accordance with claim 1, wherein said first, second and third amplifiers each comprise a feedback amplifier adapted to feed the corresponding signal back through the corresponding stator pole means.

3. An apparatus for rotatively driving a turn table in accordance with claim 1, wherein said drive signal generating means comprises
   first, second and third sensing means provided opposite to said rotor and disposed to have a phase difference of substantially 120° from each other with respect to said arrangement of magnetic poles of said rotor, each said sensing means each having a variation of the inductance thereof as a function of the rotation of said rotor,
   oscillating means for generating a signal of a predetermined frequency,
   a respective means responsive to said variation of the inductance of each said sensing means as a function of the rotation of said rotor for amplitude modulating the output signal from said oscillating means, and
   a respective means for amplitude demodulating the output signals from a corresponding amplitude modulating means.

4. An apparatus for rotatively driving a turn table in accordance with claim 3, which further comprises means interposed between said plurality of oscillating means and said amplitude modulating means for distributing the output from said oscillating means to said plurality of amplitude modulating means.

5. An apparatus for rotatively driving a turn table in accordance with claim 4, wherein said distributing means comprises means for adjusting the amplitude of the oscillation output from said oscillating means as applied to said plurality of amplitude modulating means.

6. An apparatus for rotatively driving a turn table in accordance with claim 1, which further comprises
   means operatively coupled to said motor for detecting the rotation speed of said motor, and
   means responsive to the detected output from said rotation speed detecting means for controlling the amplitude level of the drive signals from said drive signal generating means.

7. An apparatus for rotatively driving a turn table in accordance with claim 6, wherein said drive signal generating means comprises
   first, second and third sensing means provided opposite to said rotor and disposed to have a phase difference of substantially 120° from each other with respect to said arrangement of magnetic poles of said rotor, each said sensing means having a variation of the inductance thereof as a function of the rotation of said rotor,
   oscillating means for generating a signal of a predetermined frequency,
   a respective means responsive to said variation of the inductance of each said sensing means as a function of the rotation of said rotor for amplitude modulating the output signal from said oscillating means,
   a respective means for amplitude demodulating the output signals from a corresponding amplitude modulating means, and
   said controlling means comprising means for controlling the amplitude of the output from said oscillating means.

8. An apparatus for rotatively driving a turn table in accordance with claim 1, wherein said first, second and third pole means of said stator of said motor collectively comprise:
   three stator drive coils each adapted to be supplied with the corresponding one of said three drive signals having a phase difference of substantially 120° from each other, and
   three pairs of stator yokes, one yoke of each pair to be magnetized in a north pole or a south pole by means of said stator drive coils, said each pair of stator yokes having a plurality (n) of teeth spaced apart from each other by a predetermined electrical angle in terms of the arrangement of the magnetic poles of said rotor.

9. An apparatus for rotatively driving a turn table in accordance with claim 8, wherein said predetermined electrical angle is selected to be $$180 \text{ degrees} + \frac{6n}{360} \text{ degrees}.$$

10. An apparatus for rotatively driving a turn table in accordance with claim 8, wherein each of said teeth of said stator is configured in a trapezoidal shape.

* * * * *